United States Patent [19]
Searight et al.

[11] 3,816,107

[45] June 11, 1974

[54] METHOD OF INCREASING CHEMICAL DURABILITY OF GLASS

[75] Inventors: Charles E. Searight; John R. Ryan; Steven H. Brasfield, all of Jackson, Miss.

[73] Assignee: Cataphote Corporation, Jackson, Miss.

[22] Filed: Feb. 14, 1973

[21] Appl. No.: 332,418

Related U.S. Application Data

[63] Continuation-in-part of Ser. No. 117,160, Feb. 19, 1971, abandoned.

[52] U.S. Cl. ......................................... 65/30, 65/60
[51] Int. Cl. ............................................. C03c 17/10
[58] Field of Search ..................... 65/18, 21, 30, 60

[56] References Cited
UNITED STATES PATENTS

| 2,838,881 | 6/1958 | Plumat ............................... 65/21 X |
| 3,337,321 | 8/1967 | Teague, Jr. et al. ..................... 65/60 |

*Primary Examiner*—Arthur D. Kellogg
*Attorney, Agent, or Firm*—Charles J. Merriam

[57] ABSTRACT

A process for improving the chemical durability of glass products involves contacting a glass surface with an aqueous alcoholic solution of a soluble aluminum containing salt and thereafter oxidizing the aluminum to aluminum oxide.

11 Claims, No Drawings

METHOD OF INCREASING CHEMICAL DURABILITY OF GLASS

This application is a continuation-in-part of our pending U.S. application Ser. No. 117,160, filed Feb. 19, 1971 now abandoned.

The present invention relates to a method for increasing the durability of glass. In general, it concerns a process wherein a solution of soluble aluminum containing salt is used to increase the chemical durability of glass products, for example, glass beads.

The resistance which glass offers to the corroding action of water and of aqueous solutions of acids, bases and salts is a property of important practical significance. This property is generally referred to as chemical durability. A number of different methods or techniques, involving various compositions, have been suggested and/or employed in order to increase the chemical durability and chemical resistance of glass surfaces. Morey, Properties of Glass, Reinhold Publishing Co., 1954, 2nd Edition, contains an entire chapter on the chemical durability of glass. It is pointed out therein that the use of alumina ($Al_2O_3$) to increase chemical durability has long been known. For example, U.S. Pat. No. 3,337,321 discloses a method for increasing the chemical durability of a blow molded glass article by a technique which involves introducing a colloidal alumina sol into a glass parison substantially simultaneously with introducing blow air into the parison.

Adding alumina to a glass formulation in order to increase chemical durability presents several problems. For instance, adding alumina into a molten glass batch requires melting the alumina, which generally raises the viscosity of the melt, and also requires an additional amount of heat in order to melt the alumina containing glass. Moreover, such a process often causes attenuation (i.e., tends to form fibers). The use of an alumina in the form of an alumina sol, added, for example, during the glass shaping process, also presents problems. For instance, alumina sols must be maintained in a dispersed state in order to assure the desired uniformity or homogeneity; which generally requires continuous mixing or stirring. Moreover, alumina sols do not cover glass surfaces either as effectively or as completely as is possible with the present invention.

According to the present invention, it has been unexpectedly discovered that the chemical durability of glass products, for example, glass beads, can be improved by a process in which an aqueous alcoholic solution of soluble aluminum containing salt is used to contact the surface of particulate glass.

Aluminum containing salts suitable for use in the invention include aluminum chloride, aluminum nitrate and aluminum sulfate. A preferred salt is aluminum chloride which is generally employed in its hydrated form i.e., $AlCl_3 \cdot 6H_2O$.

The aqueous alcoholic solvent used to dissolve the aluminum containing salt comprises a mixture of water and lower molecular weight alcohol such as methanol and/or ethanol. The relative proportion of water and alcohol should be such that the solution does not contain so much water that it unduly wets the glass surface to which it is applied; and such that the solution may be highly concentrated with the aluminum containing salt. A preferred aqueous alcoholic solvent comprises about 50 wt. percent water and about 50 wt. percent alcohol, e.g., methanol.

As mentioned above, it is desirable to use as highly a concentrated solution as possible. A preferred solution employed in the process of the present invention comprises about 4 pounds of $AlCl_3 \cdot 6H_2O$ dissolved in 5 gallons of a 50—50 (vol. percent) mixture of water and alcohol.

The present invention can be further understood by reference to the following illustrative examples.

EXAMPLE I

In this example, the process of the present invention was employed to increase the chemical durability of glass beads.

An aqueous methanolic solution of aluminum chloride was prepared by dissolving about 4 pounds of $AlCl_3 \cdot 6H_2O$ in about 2.5 gallons of methanol. To the resulting mixture about 2.5 gallons of water was added. The resulting aqueous alcoholic solution of soluble aluminum containing salt was applied to the surface of crushed glass at a concentration of about 1 pound of $AlCl_3 \cdot 6H_2O$ per 200 pounds of crushed glass. The solution was applied, by dripping into the crushed glass as the crushed glass was conveyed by means of a screw conveyor to a verticle stack where the thus coated particles of glass are fluidized and heated to a temperature on the order of about 1,000°F., to produce glass beads having improved chemical durability, as hereafter described.

EXAMPLE II

One method employed in the industry for measuring the chemical durability of glass utilizes a Soxlett extraction unit. The glass being tested is placed in the unit, subjected to recycled steam condensate and the weight loss of the glass is determined after a predetermined length of time.

Using the Soxlett extraction technique, glass beads prepared according to Example I were subjected to Soxlett extraction for 90 hours. After 90 hours, the glass beads made according to the present invention showed a weight loss of only about 0.3 wt. percent. On the other hand, otherwise similar glass beads which were not treated according to the present invention exhibited weight losses of about 4 to about 8 percent.

EXAMPLE III

In this example, fiberglass was treated according to the process of the present invention.

The fiberglass was a commercially available grade used in the manufacture of filters and was obtained from Commercial Filters Corporation, Lebanon, Ind.

The fiberglass was treated by first surface coating the fiberglass by dipping it into an aqueous alcoholic solution, and thereafter heating the thus coated fiberglass to a temperature of about 400°F. The aqueous alcoholic solution consisted of an equal volume mixture of ethanol and water to which was added about 33 wt. percent aluminum chloride. The solution was applied to the fiberglass at a concentration of about 35 grams of solution per pound, i.e., about 2.6 wt. percent aluminum chloride, based upon the weight of the fiberglass treated.

Samples of the thus treated fiberglass were compared with samples of untreated fiberglass, using the Soxlett extraction technique. Results obtained after 96 hours indicated that two samples of the untreated fiberglass exhibited weight losses of 1.2 and 1.3 percent. In contrast, two samples of fiberglass treated according to this example of the present invention exhibited weight losses of only 0.3 and 0.5 percent.

The manner or method by which the aqueous alcoholic solution of soluble aluminum containing salt is applied to the surface of glass should be such that substantially the entire surface of the glass is contacted by the solution. Spraying, brushing and dipping are all suitable methods of applying the solution.

Those skilled in the art will be able to ascertain the optimum concentration to be employed with any particular glass product.

Satisfactory results have been obtained using the present invention when the solution has been applied to particulate glass at concentrations in the range of about 0.025 wt. percent to about 0.5 wt. percent soluble aluminum containing salt, based upon the weight of the contacted glass. With fiberglass, which generally has a relatively high surface area per unit weight, satisfactory results may be obtained at concentrations in the range of about 0.5 to about 3.0 wt. percent.

The present invention has been described and exemplified in relation to glass beads, e.g., glass beads having a particle size of 20–80 mesh and in relation to fiberglass. However, the invention is also applicable to other glass products or articles such as glass bottles, glassware, sheet glass products and the like.

The foregoing detailed description has been given for clearness of understanding only, and no unnecessary limitations should be understood therefrom as modifications will be obvious to those skilled in the art.

What is claimed is:

1. A process of treating glass with an aqueous alcoholic solution of soluble aluminum containing salt and thereafter heating the thus contacted glass to oxidize the aluminum to $Al_2O_3$, said solution having a sufficient soluble aluminum salt concentration to improve the chemical durability of the thus treated glass.

2. A process as defined by claim 1 wherein said aluminum containing salt is $AlCl_3$.

3. A process as defined by claim 1 wherein said aluminum containing salt is $Al(NO_3)_3 \cdot 9H_2O$.

4. A process as defined in claim 1 wherein said aqueous alcoholic solution comprises a mixture of water and ethanol as the solvent.

5. A process as defined by claim 1 wherein the amount of said soluble aluminum containing salt is about 0.025 wt. percent to about 3.0 wt. percent based upon the weight of the contacted glass.

6. A process as defined by claim 1 wherein the contacted glass is heated at a temperature above 1,000°F.

7. A process as defined by claim 1 wherein the glass is in the form of glass particles.

8. A process as defined by claim 1 wherein the glass is in the form of fiberglass.

9. A process for treating glass beads comprising contacting crushed glass particles with an aqueous alcoholic solution of a soluble aluminum containing salt and thereafter firing the thus contacted particles in a vertical furnace to produce glass beads of improved chemical durability.

10. A process as defined by claim 9 wherein the glass beads produced have a size in the range of about 20–80 mesh.

11. A process as defined by claim 9 wherein said contacting comprises dripping said solution onto said crushed glass particles while said particles are being transported to said vertical furnace.

* * * * *